United States Patent
Elwart et al.

(10) Patent No.: US 7,998,447 B2
(45) Date of Patent: Aug. 16, 2011

(54) METHOD FOR REMOVING HYDROGEN SULFIDE FROM AN EMISSIONS STREAM

(75) Inventors: Shane Elwart, Ypsilanti, MI (US); Gopichandra Surnilla, West Bloomfield, MI (US); Joseph R. Theis, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1983 days.

(21) Appl. No.: 10/767,339

(22) Filed: Jan. 28, 2004

(65) Prior Publication Data

US 2005/0163690 A1    Jul. 28, 2005

(51) Int. Cl.
*B01D 53/48* (2006.01)
(52) U.S. Cl. ............... 423/244.02; 423/244.01
(58) Field of Classification Search ............ 423/244.01, 423/244.02, 244.09, 244.1
See application file for complete search history.

(56) References Cited

U.S. PATENT DOCUMENTS

| | | | |
|---|---|---|---|
| 6,338,831 B1 * | 1/2002 | Strehlau et al. | 423/244.07 |
| 6,419,890 B1 * | 7/2002 | Li | 423/239.1 |
| 6,482,377 B2 * | 11/2002 | Bartley et al. | 423/213.2 |

FOREIGN PATENT DOCUMENTS

| | | |
|---|---|---|
| DE | 19827195 | 12/1999 |
| DE | 19849082 | 2/2000 |
| DE | 19921976 | 11/2000 |
| DE | 19923481 | 11/2000 |

OTHER PUBLICATIONS

S.E. Golunski et al., "Identifying the Functions of Nickel in the Attenuation of H2S Emissions from Three-way Automotive Catalysts", Catalysis Today, Elsevier Science Publishers B.V., 1991.
J.R. Asik et al., "Suppression of Sulfide Emission during Lean NOx Trap Desulfation", SAE Technical Paper Series No. 2001-01-1299 (Reprinted from: Advanced Catalytic Converters and Substrates for Gasoline Emission Systems (SP-1573)), Mar. 5-8, 2001.
Jon G. McCarty et al., "Thermodynamics of Sulfur Chemisorption on Metals. I. Alumina-supported Nickel", Materials Research Laboratory, SRI International.

* cited by examiner

*Primary Examiner* — Edward M Johnson
(74) *Attorney, Agent, or Firm* — Julia Voutyras; Alleman Hall McCoy Russell & Tuttle LLP (57) ABSTRACT

A method of removing hydrogen sulfide from an emissions stream is disclosed, wherein the method includes directing the emissions stream into a hydrogen sulfide converter having a metal oxide catalyst, adsorbing the hydrogen sulfide in the emissions stream to the metal oxide catalyst in the hydrogen sulfide converter, reacting the hydrogen sulfide with at least one of an oxidant and a reductant in the hydrogen sulfide converter to chemically transform the hydrogen sulfide, and adjusting an air-fuel ratio of the emissions stream based on exhaust temperature of an emission control device, where the adjustment varies a duration of at least one of lean and rich operation to perform the adsorbing and reacting even as exhaust temperature varies.

40 Claims, 6 Drawing Sheets

METHOD FOR REMOVING HYDROGEN SULFIDE FROM AN EMISSIONS STREAM

BACKGROUND

Lean-burning engines, or engines that run on an air/fuel mixture with a stoichiometrically greater amount of air than fuel can offer improved fuel economy relative to engines configured to run on stoichiometric air/fuel mixtures.

However, lean-burning engines also may pose various disadvantages. For example, burning a lean air/fuel mixture may decrease the reduction of nitrogen oxides (collectively referred to as "$NO_x$").

Various mechanisms have been developed to reduce $NO_x$ emissions in lean-burning engines. One mechanism is a catalyst known as a $NO_x$ trap. The $NO_x$ trap is a catalytic device typically positioned downstream of the catalytic converter in an emissions system, and is configured to retain $NO_x$ when the engine is running a lean air/fuel mixture for eventual reduction when the engine runs a more rich air/fuel mixture. A typical $NO_x$ trap includes an alkali or alkaline metal, such as barium or calcium, to which $NO_x$ adsorbs when the engine is running a lean air/fuel mixture. The engine can then be configured to periodically run a richer air/fuel mixture to produce carbon monoxide, hydrogen gas and various hydrocarbons to reduce the $NO_x$ in the trap, thus decreasing $NO_x$ emissions and regenerating the trap.

The use of a $NO_x$ trap can substantially reduce $NO_x$ emissions from a lean-burning engine. However, $NO_x$ traps are also susceptible to poisoning from sulfur in fuels. Sulfur, typically in the form of sulfate ($SO_4^{2-}$) may adsorb to the trap in the form of a material such as barium or calcium sulfate. The sulfur compounds may block $NO_x$ from adsorbing to the trap surfaces, and thus may increase $NO_x$ emissions.

Various methods of desulfating $NO_x$ traps may be used. These methods, while effective in removing $SO_x$ from the trap surfaces, can cause the production of hydrogen sulfide. Specifically, the inventors herein have recognized that variations in air-fuel ratio that may occur at certain stages of reactions can cause the production of hydrogen sulfide in different ways depending on exhaust temperature.

SUMMARY

A system and method for removing hydrogen sulfide from an emissions stream is disclosed, wherein the method includes directing the emissions stream into a hydrogen sulfide converter having a metal oxide catalyst, adsorbing the hydrogen sulfide in the emissions stream to the metal oxide catalyst in the hydrogen sulfide converter, reacting the hydrogen sulfide with at least one of an oxidant and a reductant in the hydrogen sulfide converter to chemically transform the hydrogen sulfide, and adjusting an air-fuel ratio of the emissions stream based on exhaust temperature of an emission control device, where said adjustment varies a duration of at least one of lean and rich operation to perform said adsorbing and reacting even as exhaust temperature varies. The provided system and method thus allow a $NO_x$ trap to be desulfated while reducing the emission of hydrogen sulfide across a wide exhaust temperature range.

DETAILED DESCRIPTION OF THE DEPICTED EMBODIMENTS

Figure 1:
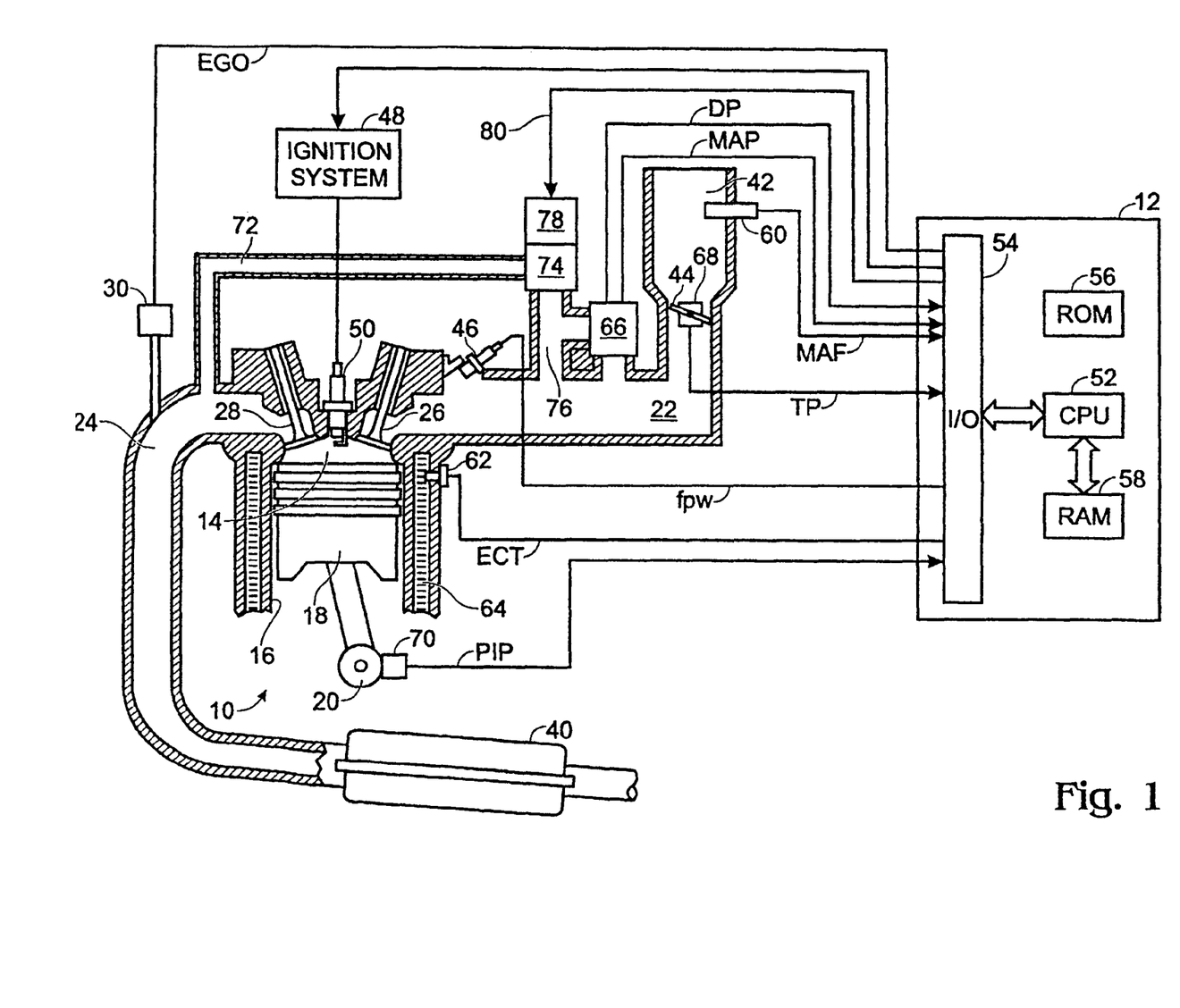
FIG. 1 is a schematic view of an internal combustion engine according to a first embodiment of the present invention.

FIG. 1 shows a schematic depiction of an internal combustion engine 10. Engine 10 typically includes a plurality of cylinders, one of which is shown in FIG. 1, and is controlled by an electronic engine controller 12. Engine 10 includes a combustion chamber 14 and cylinder walls 16 with a piston 18 positioned therein and connected to a crankshaft 20. Combustion chamber 14 communicates with an intake manifold 22 and an exhaust manifold 24 via a respective intake valve 26 and exhaust valve 28. An exhaust gas oxygen sensor 30 is coupled to exhaust manifold 24 of engine 10, and an emissions treatment stage 40 is coupled to the exhaust manifold downstream of the exhaust gas oxygen sensor.

Intake manifold 22 communicates with a throttle body 42 via a throttle plate 44. Intake manifold 22 is also shown having a fuel injector 46 coupled thereto for delivering fuel in proportion to the pulse width of signal (fpw) from controller 12. Fuel is delivered to fuel injector 46 by a conventional fuel system (not shown) including a fuel tank, fuel pump, and fuel rail (not shown). Engine 10 further includes a conventional distributorless ignition system 48 to provide an ignition spark to combustion chamber 30 via a spark plug 50 in response to controller 12. In the embodiment described herein, controller 12 is a conventional microcomputer including: a microprocessor unit 52, input/output ports 54, an electronic memory chip 56, which is an electronically programmable memory in this particular example, a random access memory 58, and a conventional data bus.

Controller 12 receives various signals from sensors coupled to engine 10, in addition to those signals previously discussed, including: measurements of inducted mass air flow (MAF) from a mass air flow sensor 60 coupled to throttle body 42; engine coolant temperature (ECT) from a temperature sensor 62 coupled to cooling jacket 64; a measurement of manifold pressure (MAP) from a manifold absolute pressure sensor 66 coupled to intake manifold 22; a measurement of throttle position (TP) from a throttle position sensor 68 coupled to throttle plate 44; and a profile ignition pickup signal (PIP) from a Hall effect sensor 118 coupled to crankshaft 40 indicating an engine speed (N).

Exhaust gas is delivered to intake manifold 22 by a conventional EGR tube 72 communicating with exhaust manifold 24 EGR valve assembly 74, and EGR orifice 76. Alternatively, tube 72 could be an internally routed passage in the engine that communicates between exhaust manifold 24 and intake manifold 22.

Manifold absolute pressure sensor 66 communicates with EGR tube 72 between valve assembly 74 and orifice 76. Manifold absolute pressure sensor 66 also communicates with intake manifold 22. Stated another way, exhaust gas travels from exhaust manifold 24 first through EGR valve assembly 74, then through EGR orifice 76, to intake manifold 22. EGR valve assembly 74 can then be said to be located upstream of orifice 76.

Manifold absolute pressure sensor 66 provides a measurement of manifold pressure (MAP) and pressure drop across orifice 74 (DP) to controller 12. Signals MAP and DP are then used to calculate EGR flow. EGR valve assembly 74 has a valve position (not shown) for controlling a variable area restriction in EGR tube 72, which thereby controls EGR flow. EGR valve assembly 74 can either minimally restrict EGR flow through tube 72 or completely restrict EGR flow through tube 72. Vacuum regulator 78 is coupled to EGR valve assembly 73. Vacuum regulator 78 receives actuation signal on line 80 from controller 12 for controlling valve position of EGR valve assembly 74. In a preferred embodiment, EGR valve assembly 74 is a vacuum actuated valve. However, as is obvious to those skilled in the art, any type of flow control valve may be used, such as, for example, an electrical solenoid powered valve or a stepper motor powered valve. Note that alternative EGR systems can also be used, such as those having an orifice upstream of the EGR control valve. Further, systems utilizing a stepper motor valve without an orifice can also be used.

Figure 2:
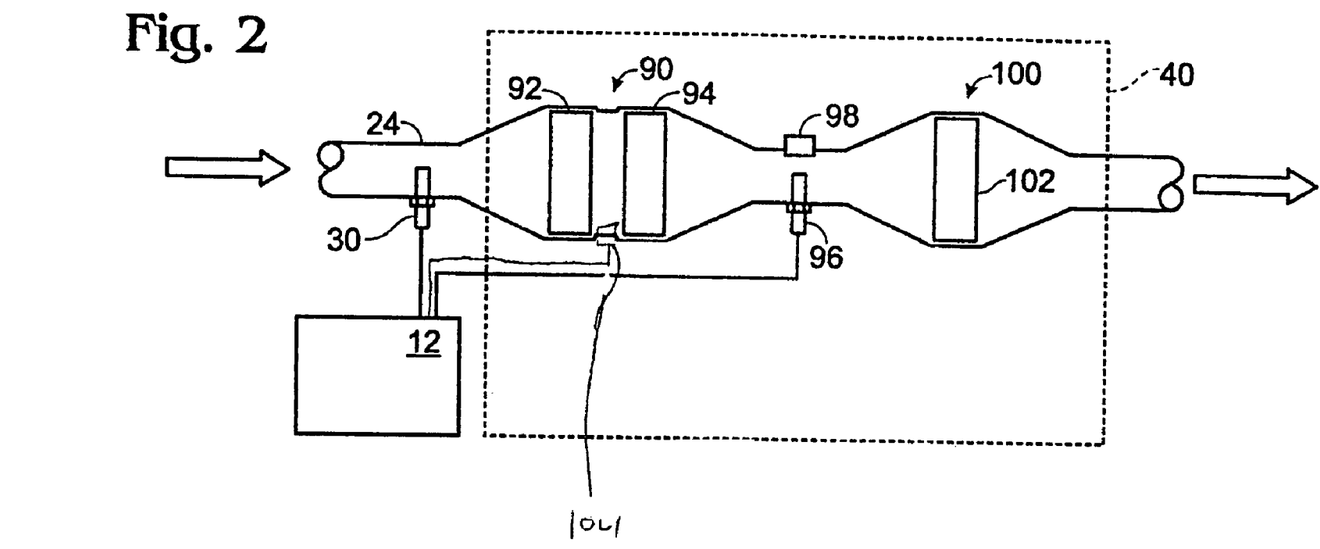
FIG. 2 is a schematic view of an exemplary emissions treatment stage of the embodiment of FIG. 1.

FIG. 2 shows a schematic view of an exemplary configuration of emissions treatment stage 40. Emissions treatment stage 40 includes a catalytic converter 90 connected to exhaust manifold 24 downstream of oxygen sensor 30. Catalytic converter 90 includes a $NO_x$ trap 92 and 94. Traps 92 and 94 are configured to trap nitrogen oxides when engine 10 is running on a lean air/fuel mixture, and to allow reduction of the nitrogen oxides to nitrogen by catalytic action when the engine is running a richer air/fuel mixture. A second oxygen sensor 96 and a mass flow detector 98 may be provided downstream of catalytic converter 90. Alternatively, the mass flow rate of the exhaust may be estimated from the speed and load of the engine. Note also that an additional three-way catalyst (not shown) can be coupled upstream of converter 90. Furthermore, a temperature sensor 104 for sensing the temperature of the $NO_x$ trap may be provided to help monitor the retention of sulfur and production of $H_2S$ by the $NO_x$ trap, as described in more detail below. While temperature sensor 104 is shown in the depicted embodiment as being positioned between traps 92 and 94, the temperature sensor may also be positioned either upstream or downstream of traps 92 and 94, or upstream, downstream, or within a hydrogen sulfide converter 100.

Hydrogen sulfide converter 100 is disposed downstream of catalytic converter 90. As mentioned above, $NO_x$ trap 92 may be susceptible to degradation by sulfates produced by the combustion of sulfur-containing fuels. Various methods have been developed to desulfate $NO_x$ traps. These methods typically involve heating a $NO_x$ trap in the presence of a reductant, such as hydrogen gas. The hydrogen may be produced by temporarily providing a rich air/fuel mixture to engine 10.

The heating of the sulfates in the presence of hydrogen reduces the sulfates to sulfur dioxide but also may produce undesirable concentrations of hydrogen sulfide. Thus, engine 10 includes hydrogen sulfide converter 100 downstream of catalytic converter 90 to catalyze the transformation of hydrogen sulfide to a less-noxious and less-toxic gas-phase sulfur compound (or compounds), thus lowering hydrogen sulfide in the emissions stream.

Hydrogen sulfide converter 100 includes a metal oxide catalyst 102 configured to catalyze the oxidation of hydrogen sulfide. Any suitable metal oxide catalyst may be used. Suitable metal oxide catalysts include those capable of catalyzing the chemical transformation of hydrogen sulfide to sulfur dioxide in the presence of gases commonly found in combustion engine exhaust. One example of a suitable metal oxide catalyst is nickel oxide. Nickel oxide is capable of catalyzing the transformation of hydrogen sulfide to sulfur dioxide via multiple different reaction pathways. A first exemplary set of reactions for accomplishing this transformation are as follows:

$$3NiO+H_2+2H_2S \rightarrow Ni_3S_2+3H_2O \qquad (1)$$

$$Ni_3S_2+SO_2+5O_2 \rightarrow 3NiSO_4 \qquad (2)$$

$$NiSO_4+H_2 \rightarrow NiO+SO_2+H_2O \qquad (3)$$

A rich air/fuel mixture may be provided to engine 10 while reaction (1) is taking place so that adequate hydrogen is available for the conversion of nickel oxide and hydrogen sulfide to nickel sulfide and water. Once reaction (1) has proceeded to a desired degree, a lean air/fuel mixture may be provided to engine 10 while reaction (2) is taking place so that sufficient oxygen is in the exhaust gases to allow the oxidation of nickel sulfide to nickel sulfate. Additionally, sulfur dioxide produced both by the burning of sulfur-containing fuel and the desulfation of $NO_x$ trap 92 may act as an oxidant in this reaction, and may also provide additional sulfur for the reaction. Once reaction (2) has proceeded to a desired degree, a rich air/fuel mixture may again be supplied to engine 10 during reaction (3) to provide sufficient hydrogen for the reduction of sulfate to sulfur dioxide to occur. This reaction regenerates the nickel oxide catalyst, and produces sulfur dioxide and water for emission from emissions treatment stage 40.

Figure 3:
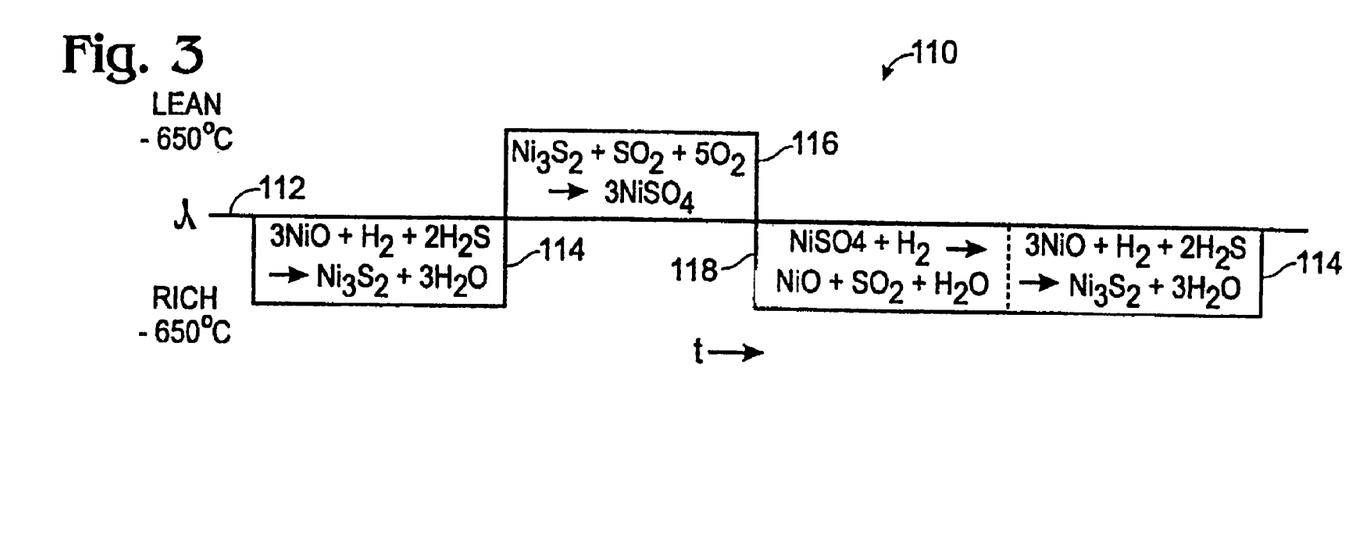
FIG. 3 is a graphical representation of a method of removing hydrogen sulfide from an emissions stream according to one embodiment of the present invention.

Reactions (1)-(3) may each be performed at any suitable temperature. FIG. 3 shows, generally at 110, a graphical representation of reactions (1)-(3) illustrating one exemplary reaction temperature scheme. In FIG. 3, the vertical axis represents a quantity λ defined as (air:fuel$_{actual}$/air:fuel$_{stoichiometric}$), and the horizontal axis represents time. Horizontal line 112 represents a λ of one, regions below line 112 represent a rich air/fuel mixture, and regions above line 112 represent a lean air fuel mixture. Reaction (1) is indicated at 114, reaction (2) is indicated at 116, and reaction (3) is indicated at 118.

In the embodiment of FIG. 3, reactions (1)-(3) all take place at a temperature of approximately 650 degrees Celsius, as the chemical equilibriums underlying reactions (1)-(3) are favorable for these reactions at this temperature. Performing each of these reactions at the same temperature may offer various advantages. For example, performing all of these reactions at a single temperature may allow the hydrogen sulfide conversion process to be performed more quickly, as no time needs to be spent changing reaction temperatures. Furthermore, it may allow a simpler temperature control mechanism to be used in connection with catalytic converter 90 and hydrogen sulfide converter 100. While FIG. 3 depicts the reactions as occurring at approximately 650 degrees Celsius, it will be appreciated that these reactions may be performed at any suitable temperature other than 650 degrees Celsius, including temperatures between 625 and 750 degrees Celsius. Even lower temperatures may be used, but the reaction rates may be slow.

The reaction temperature may be set and controlled in any suitable manner. For example, the reaction temperature may be set by simply positioning hydrogen sulfide converter 100 a suitable distance from combustion chamber 14 so that the exhaust gases heat the hydrogen sulfide converter. The converters may be heated by varying the A/F ratio of the engine lean and rich in order to generate an exotherm on the catalysts. Further temperature control may be accomplished by varying the air/fuel mixture supplied to engine 10 to adjust the amount of heat produced by the engine. Alternatively, hydrogen sulfide converter 100 may include an electric heating system (not shown) to help control the temperature of reactions occurring with the hydrogen sulfide converter.

Figure 4:
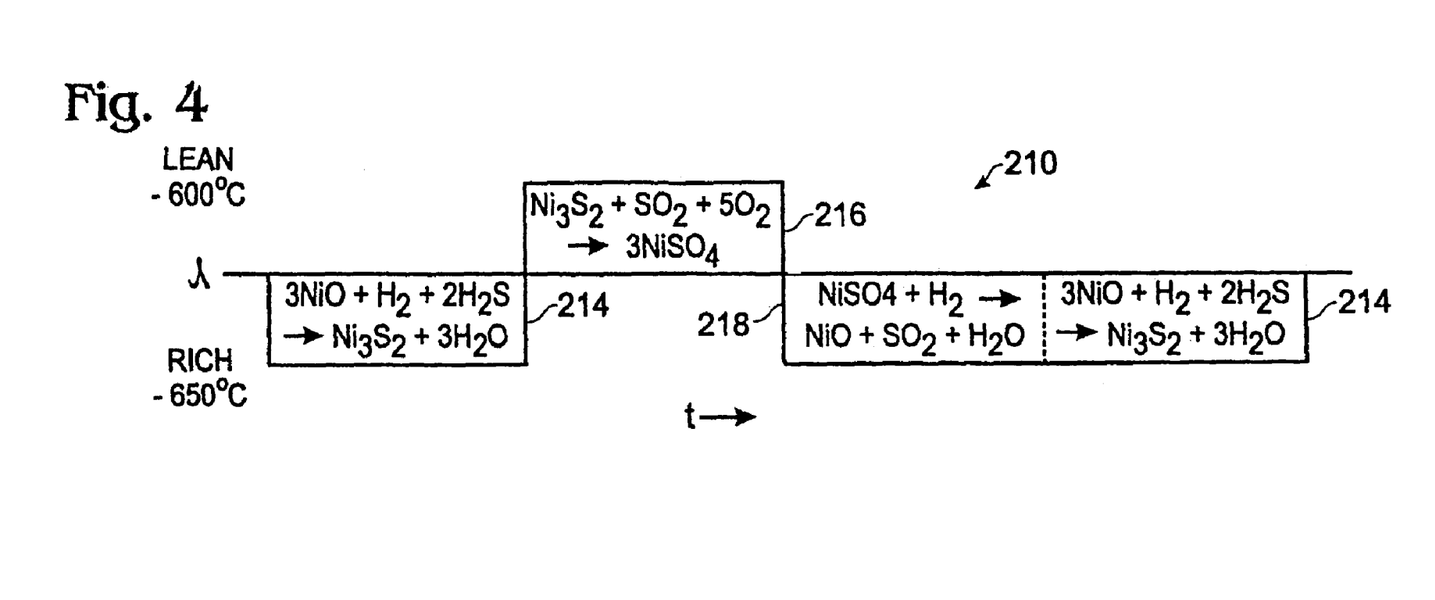
FIG. 4 is a graphical representation of a method of removing hydrogen sulfide from an emissions stream according to another embodiment of the present invention.

FIG. 4 shows, generally at 210, a graphical representation of another embodiment of a method for removing hydrogen sulfide from an emissions stream via hydrogen sulfide converter 100. The embodiment of FIG. 4 utilizes a different reaction temperature scheme for reactions (1)-(3). As with the embodiment of FIG. 3, reactions (1) and (3), indicated at 214 and 218 respectively, are carried out at a temperature of approximately 650 degrees Celsius.

However, reaction (2), indicated at 216, is carried out at a temperature of approximately 600 degrees Celsius. The use of a lower temperature for reaction (2) may help to reduce the formation of hydrogen sulfide in catalytic converter 90 during reaction (2). This may be advantageous, as the surface of the nickel oxide catalyst within hydrogen sulfide converter 100 may be fully saturated with $Ni_3S_2$ during reaction (2), and thus may be unable to adsorb more hydrogen sulfide during this phase of the hydrogen sulfide conversion process. While reaction (2) is depicted in FIG. 4 as occurring at 600 degrees Celsius, it will be appreciated that this reaction may be performed at any suitable temperature other than 600 degrees Celsius, including temperatures between 575 and 750 degrees Celsius, or even outside of this range.

The temperature of hydrogen sulfide converter 100 may be reduced for reaction (2) in any desired manner. For example, the air/fuel mixture provided to engine 10 may be made temporarily lean to reduce an amount of heat generated by the reactions. Alternatively, where hydrogen sulfide converter 100 is heated via an electric heating system, an amount of heat provided to hydrogen sulfide converter 100 may be reduced. For example, where hydrogen sulfide converter 100 is heated resistively, an amount of current provided to the resistive heater may be reduced.

Likewise, engine 10 may be configured to vary the air/fuel mixture between rich and lean for reactions (1)-(3) in any suitable manner. For example, the air/fuel mixture may be varied by varying the amount of air admitted through throttle 42 while holding the amount of fuel injected by fuel injector 46 generally constant, or by varying the amount of fuel injected by the fuel injector while holding the amount of air admitted through the throttle generally constant.

The frequency at which the air/fuel ratio and/or reaction temperature are modulated may be determined in any suitable manner. For example, each reaction may be allowed to proceed for a predetermined interval. The predetermined interval may be a time interval, a number of engine cycles, or any other suitable interval by which a reaction duration may be defined.

Alternatively, the modulation of the air/fuel ratio and/or reaction temperature may be determined dynamically. One example of a suitable method for dynamically modulating the air/fuel mixture and/or reaction temperature involves estimating a saturation of the nickel oxide substrate with reactants and/or products during each of reactions (1)-(3), and modulating the air/fuel mixture and/or temperature when a predetermined level of saturation of reactants and/or products on the nickel oxide catalyst surface is reached. The estimations of species saturation and modulations of the air/fuel mixture and/or temperature may be performed by controller 12, which may include code stored thereon executable to perform these operations.

An estimation of the saturation of the nickel oxide catalyst by hydrogen sulfide may be determined by integration of the estimated hydrogen sulfide concentration leaving catalytic converter 90. First, an available amount of NiO surface available ($NiO_{av}$) for performing reaction (1) may be determined from a known surface area of NiO within hydrogen sulfide converter 100 together with a known capacity ($NiO_{cap}$) and efficiency ($NiO_{eff}$) of NiO at converting $H_2$ and $H_2S$ to $Ni_3S_2$ on the surface of the NiO catalyst as a function of substrate temperature. Next, an estimated amount of hydrogen sulfide ($H_2S_{est}$) leaving catalytic converter 90 may be determined on a continuous or periodic basis. From these quantities, an instantaneous amount of hydrogen sulfide adsorbed on the NiO catalyst in the form of nickel sulfide may be determined from the amount of available NiO and the estimated concentration of hydrogen sulfide in the emissions stream. The instantaneous NiO saturations then may be integrated over a period of time to determine an overall saturation. This may be expressed mathematically as:

$$[Ni_3S_2] = \frac{\int [H_2S]_{inst} \cdot am \cdot \eta_1 \cdot dt}{NiO_{cap}} \quad (4)$$

where $$[H_2S]_{inst} = [S]_{LNT} \cdot n_2 \quad (5)$$

and $[Ni_3S_2]$≡percent saturation of nickel oxide with hydrogen sulfide in the form of nickel sulfide;

$[H_2S]_{inst}$≡instantaneous concentration of hydrogen sulfide in the emissions stream;

$[S]_{LNT}$≡instantaneous concentration of sulfur on the lean $NO_x$ trap, calculated from a continuous estimation of the sulfur stored in the lean $NO_x$ trap at the beginning of the desulfation as well as during the desulfation;

$\lambda$≡(air/fuel)$_{actual}$/(air/fuel)$_{stoichiometric}$;

am≡air mass flowing into hydrogen sulfide converter 100;

$\eta_1$≡efficiency of hydrogen sulfide absorption on nickel oxide;

$\eta_2$≡efficiency of hydrogen sulfide formation as a function of the $NO_x$ trap temperature and $\lambda$; and $NiO_{cap}$≡capacity of nickel oxide to adsorb hydrogen sulfide.

Figure 5:
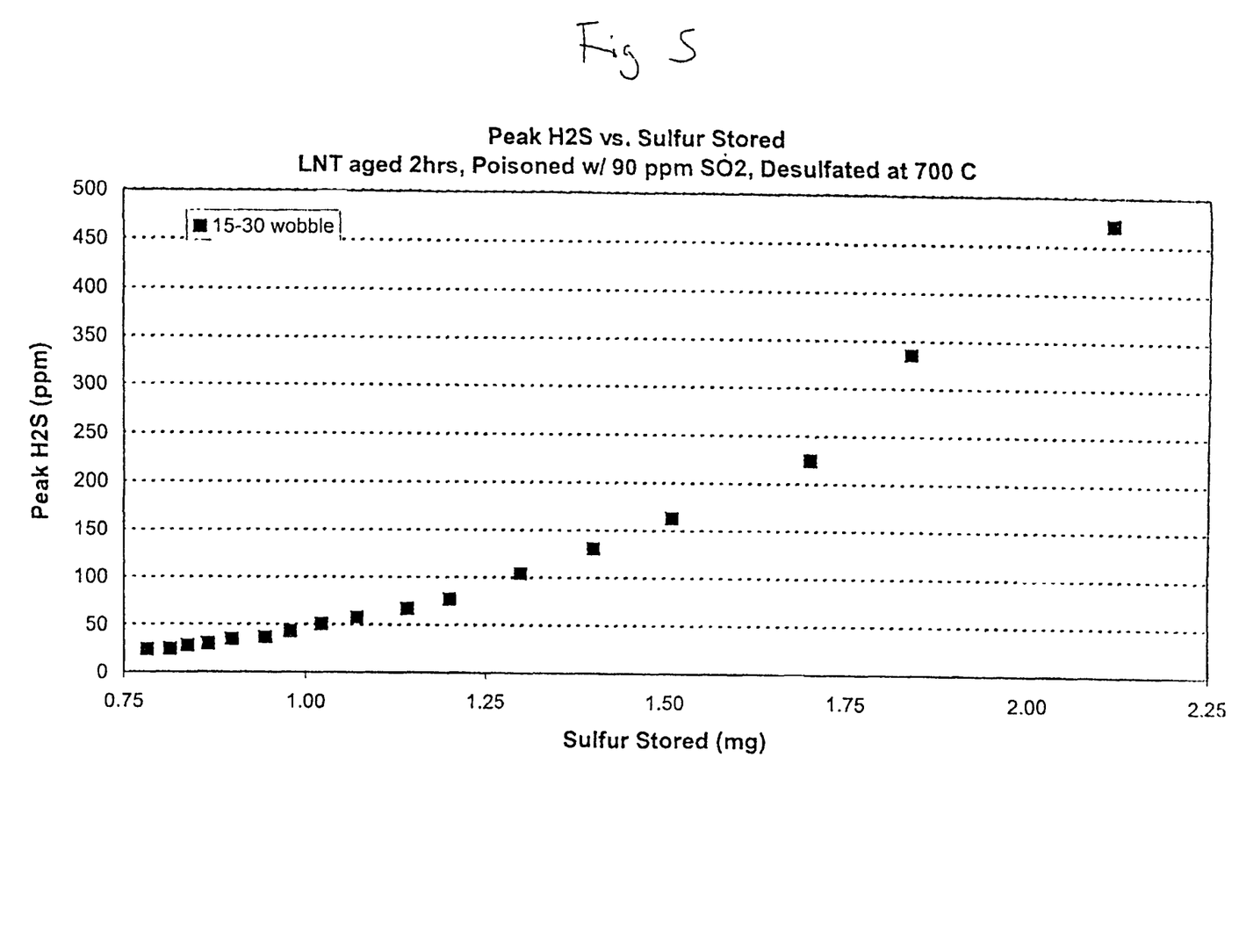
FIG. 5 is a graph showing a peak $H_2S$ emission as a function of an amount of sulfur stored on a lean $NO_x$ trap during a desulfation at 700 C utilizing a 15 second lean/30 second rich A/F wobble.

The $[H_2S]_{inst}$ can be estimated from an analytical equation involving the amount of sulfur on the lean $NO_x$ trap (LNT), the LNT temperature, and the air/fuel (A/F) ratio. Alternatively, $[H_2S]_{inst}$ may be obtained from lookup tables relating $[H_2S]_{inst}$ to these parameters. FIG. 5 shows the peak $H_2S$ emission as a function of the amount of sulfur stored on a lean $NO_x$ trap during a desulfation at 700 C utilizing a 15 second lean/30 second rich A/F wobble. Similar data obtained at different temperatures and with different rich A/F ratios would provide the information necessary for such an analytical expression or for such lookup tables.

Using these relationships, the nickel oxide catalyst may be determined to be saturated when the saturation of the nickel oxide with nickel sulfide is determined to be equal to or greater than a preselected saturation level. When the preselected saturation point of the nickel oxide substrate with nickel sulfide is reached, the air/fuel mixture provided to engine 10 may be modulated from rich to lean and the reaction temperature may be decreased to begin the oxidation of nickel sulfide to nickel sulfate. The saturation point of the nickel sulfide with $SO_2$ and $O_2$ (and thus the endpoint of the nickel sulfide oxidation reaction) may be monitored and calculated in the same manner as the saturation of nickel oxide with hydrogen sulfide described above, except that estimated concentrations of sulfur dioxide, rather than estimated concentrations of hydrogen sulfide, are monitored. The calculation of the saturation of nickel sulfide with $SO_2$ may be expressed by:

$$[NiSO_4] = \frac{\int [SO_2]_{inst} \cdot am \cdot \eta_3 \cdot dt}{NiO_{cap}} \quad (6)$$

where:

$$[SO_2]_{inst} = [S]_{LNT} \cdot n_4 \quad (7)$$

and

[$NiSO_4$]=percent saturation of nickel oxide with nickel sulfate;

[$SO_2$]$_{inst}$=instantaneous concentration of sulfur dioxide in the emissions stream;

$\eta_3$=efficiency of sulfur dioxide absorption on nickel sulfide; and $\eta_4$=efficiency of sulfur dioxide formation as a function of the $NO_x$ trap temperature and $\lambda$.

The [$SO_2$]$_{inst}$ under lean conditions can be estimated in a manner similar to that for estimating the concentration of $H_2S$ under rich conditions.

Using these relationships, the nickel sulfide may be determined to be saturated with sulfur dioxide when the concentration of nickel sulfate is determined to be equal to or greater than a preselected saturation level.

Once the estimated saturation of nickel sulfide with sulfur dioxide is reached, the air/fuel mixture provided to engine 10 may again be modulated to rich, and the reaction temperature may be increased to commence reaction (3). The regeneration of nickel oxide by reduction of the nickel sulfate with hydrogen may be expressed by:

$$[NiO] = \frac{\int [H_2]_{inst} \cdot am \cdot \eta_5 \cdot dt}{[NiSO4]} \quad (8)$$

where:

[NiO]=percent of NiO regenerated;

[$H_2$]$_{inst}$=instantaneous concentration of hydrogen in the emissions stream at a selected air/fuel ratio; and $\eta_5$=efficiency of hydrogen absorption on nickel sulfate.

Figure 6:
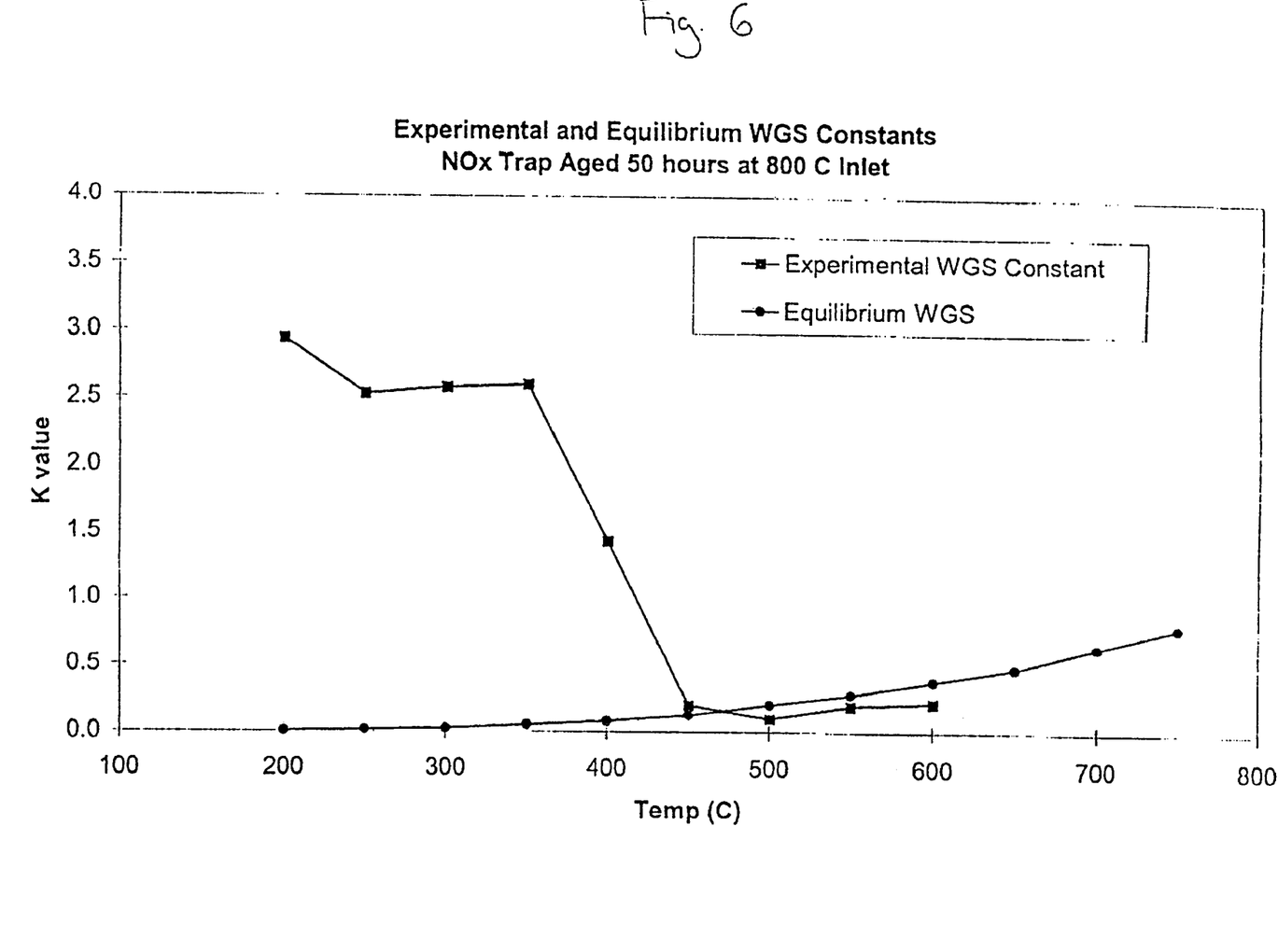
FIG. 6 is a graph showing experimental and equilibrium water-gas-shift constants in an aged $NO_x$ trap as a function of temperature.

The [$H_2$]$_{inst}$ can be estimated from the A/F ratio measured with sensor 96 and from the equilibrium water-gas-shift constant evaluated at the temperature of the lean $NO_x$ trap. FIG. 6 is a graph showing that an aged lean $NO_x$ trap is able to drive the exhaust to the equilibrium water-gas-shift condition at desulfation temperatures. Therefore, the A/F ratio and the water-gas-shift constant permit the estimation of the instantaneous CO and $H_2$ concentrations.

The total amount of NiO regenerated may then be compared to a preselected threshold. When the preselected threshold is reached, reaction (1) may be begun anew, starting a new cycle of hydrogen sulfide conversion.

By modulating the air/fuel mixture provided to engine 10 and/or the reaction temperature based upon estimated saturations of the nickel oxide catalyst with reactants and products at each step in the hydrogen sulfide conversion process, a more efficient hydrogen sulfide conversion may be achieved relative to the use of fixed intervals for each reaction. This is because it allows the catalytic capabilities of the nickel oxide catalyst to be used more efficiently than fixed interval methods.

Figure 7:
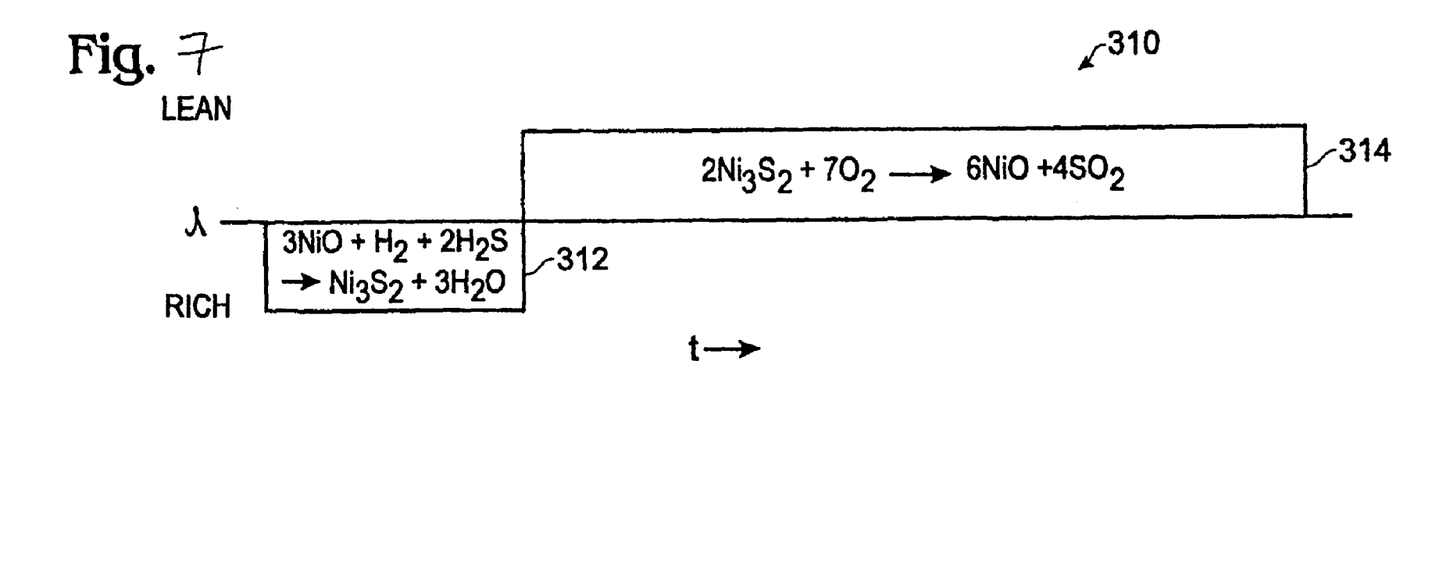
FIG. 7 is a graphical representation of a method of removing hydrogen sulfide from an emissions stream according to yet another embodiment of the present invention.

FIG. 7 shows, generally at 310, another embodiment of a method of converting hydrogen sulfide in an emissions stream to less noxious compounds. Whereas the embodiments of FIGS. 3 and 4 utilize a three-step process to convert hydrogen sulfide to sulfur dioxide, the embodiment of FIG. 7 utilizes a two-step process. Method 310 first utilizes reaction (1) described above to reduce hydrogen sulfide to nickel sulfide on the surface of the nickel oxide catalyst, as indicated at 312. However, rather than oxidizing the nickel sulfide to nickel sulfate, method 310 utilizes the following oxidation reaction to convert nickel sulfide directly to sulfur dioxide and nickel oxide.

$$2Ni_3S_2 + 7O_2 \rightarrow 6NiO + 4SO_2 \quad (9)$$

This is indicated at 314 in FIG. 7. Reaction (9) may be carried out at a lower temperature than the oxidation steps of the embodiments of FIGS. 3 and 4 to help prevent the formation of nickel sulfate. For example, reaction (9) may be carried out at a temperature of approximately 350-400 degrees Celsius. Temperatures in this range correspond to those used during ordinary operation of engine 10 when running a lean air/fuel mixture. Furthermore, the lean air/fuel mixture used to produce oxygen for reaction (9) may be produced by running engine 10 under ordinary lean conditions. Therefore, the embodiment of FIG. 7 may allow the hydrogen sulfide conversion process to be more easily implemented, as it uses ordinary engine operating conditions for a major portion of the hydrogen sulfide conversion process.

The modulation of reaction conditions between the reactions shown at 312 and 314 in FIG. 7 may be performed in the same manner as described above for the embodiments of FIGS. 3 and 4, except that the rate of saturation of the nickel sulfide with oxygen, instead of with sulfur dioxide, may be monitored to determine when to modulate the reaction conditions. The oxygen concentration may be estimated from the A/F ratio measured at sensor 96.

Figure 8:
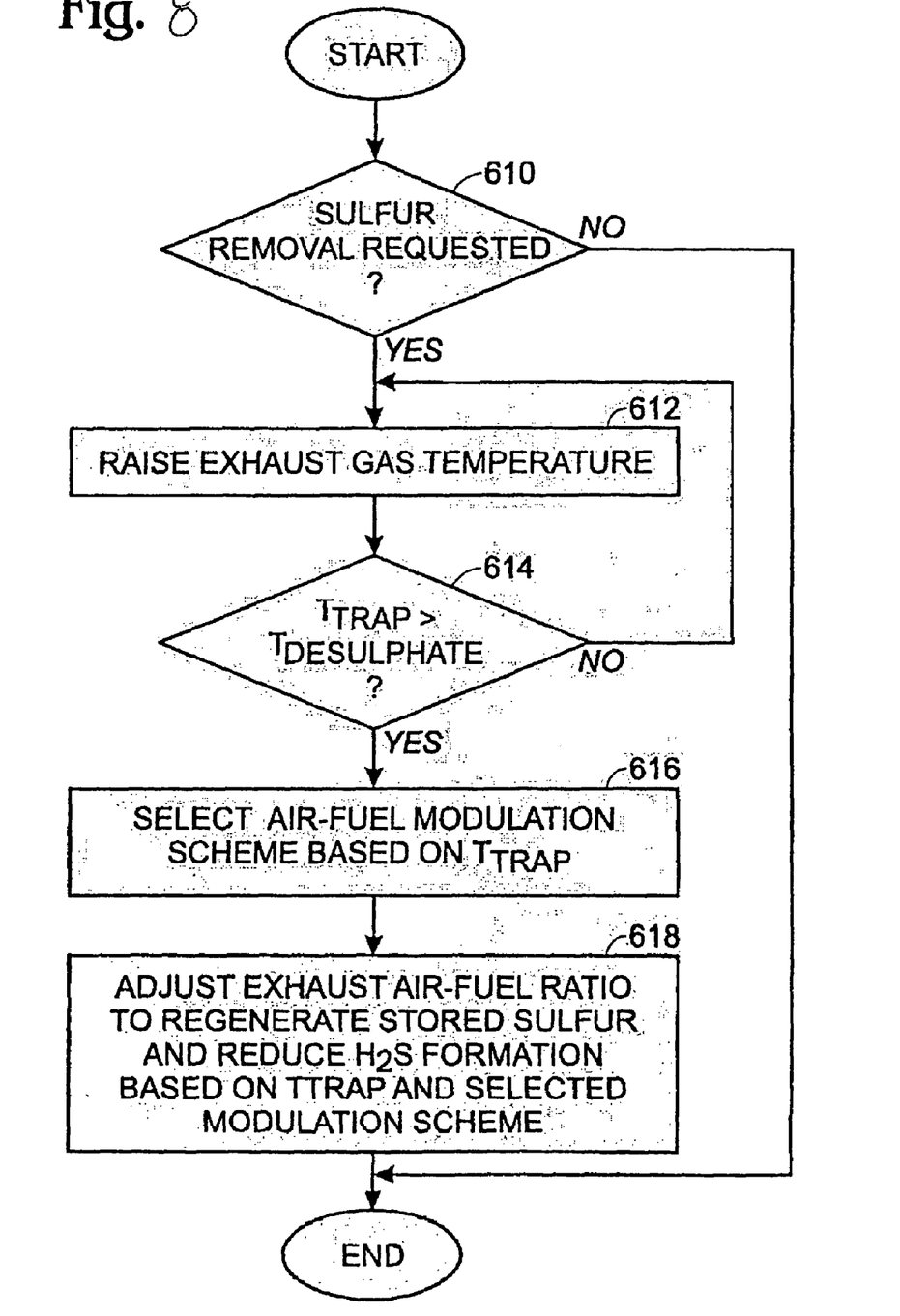
FIG. 8 is a high level flowchart illustrating example operation.

Referring now to FIG. 8, an example routine is described for controlling engine air-fuel ratio to remove sulfur while reducing generation of hydrogen sulfide. Specifically, in step 610, a determination is made as to whether sulfur removal is requested. Sulfur removal can be requested in a variety of ways, such as based on a number of miles driven, based on an estimate of stored sulfur, or based on a combination thereof. When the answer to step 610 is yes, the routine continues to step 612. In step 612, the routine raises exhaust gas temperature, such as by retarding ignition timing, operating some cylinders lean and others rich, alternating the A/F ratio of the engine lean and rich to generate an exotherm on the catalysts, or via electrically heating the catalyst. Then, in step 614, a determination is made as to whether temperature of the trap ($T_{trap}$) is greater than a desulphation temperature ($T_{desulphate}$). If so, the routine continues to step 616 where the air-fuel ratio modulation scheme is selected based on exhaust temperature, for example, temperature $T_{trap}$. In other words, as described above, different reactions and air-fuel ratio modulation durations are used to reduce $H_2S$ emissions at different temperatures, since different temperature support different reactions. Then, the routine continues to step 618, where the exhaust air-fuel ratio is adjusted to regenerated stored sulfur and reduce $H_2S$ emissions based on the determined temperature (e.g., $T_{trap}$) and the selected modulation scheme. Any, or a combination of, the acts in the various alternative methods described above can be carried out. For example, estimates of particular constituents can be used, or predetermined air-fuel ratios can be used based on characteristic maps stored in engine controller 12. In this way, the different modulation schemes (with, for example, different durations, or rich/lean air-fuel levels) can be used to reduce $H_2S$ emissions, even as temperature in the exhaust varies. This is possible since this approach uses the knowledge of different reactions occurring at different temperatures to allow reduction of $H_2S$ emissions over a wider variety of desulphation temperatures. Further, the required desulphation temperature ($T_{desulphate}$) can be lowered to allow desulphation that may reduce degradation to exhaust emissions components. In other words, FIG. 8 shows how the various alternative embodiments described above for reducing $H_2S$ emissions in different temperature ranges can be combined and used in a single system, thereby enabling improved system operation.

It will be appreciated that the reaction conditions disclosed herein are exemplary in nature, and that these specific embodiments are not to be considered in a limiting sense, because numerous variations are possible. The subject matter of the present disclosure includes all novel and non-obvious combinations and subcombinations of the various reaction conditions, modulation frequencies, species determination methods, saturation estimate methods, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the reaction conditions, modulation frequencies, species determination methods, saturation estimate methods, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of removing hydrogen sulfide from an emissions stream, comprising:
   directing the emissions stream into a hydrogen sulfide converter having a metal oxide catalyst;
   adsorbing the hydrogen sulfide in the emissions stream to the metal oxide catalyst in the hydrogen sulfide converter;
   reacting the hydrogen sulfide with at least one of an oxidant and a reductant in the hydrogen sulfide converter to chemically transform the hydrogen sulfide; and
   adjusting an air-fuel ratio of the emissions stream in response to exhaust temperature of an emission control device, where said adjustment varies a duration of at least one of lean and rich operation to perform said adsorbing and reacting even as exhaust temperature varies.

2. The method of claim 1, wherein the metal oxide catalyst includes nickel oxide.

3. The method of claim 2, wherein the hydrogen sulfide is reacted with the reductant to form nickel sulfide.

4. The method of claim 3, wherein the reductant is hydrogen gas.

5. The method of claim 3, further comprising reacting the nickel sulfide with an oxidant to form nickel sulfate.

6. The method of claim 5, wherein the oxidant includes at least one substance selected from the group consisting of oxygen and sulfur dioxide.

7. The method of claim 5, wherein the oxidant is produced by a combustion engine running a lean air/fuel mixture.

8. The method of claim 5, wherein the nickel sulfide is reacted with the oxidant at a temperature of between approximately 625 and 675 degrees Celsius.

9. The method of claim 5, wherein the nickel sulfide is reacted with the oxidant at a temperature of between approximately 575 and 625 degrees Celsius.

10. The method of claim 5, further comprising reacting the nickel sulfate with a reductant to produce sulfur dioxide and to regenerate the nickel oxide.

11. The method of claim 10, wherein the reductant is hydrogen gas.

12. The method of claim 3, further comprising reacting the nickel sulfide with oxygen to directly form nickel oxide and sulfur dioxide.

13. The method of claim 3, wherein the nickel sulfide is reacted with the oxidant at a temperature of between 350 and 400 degrees Celsius.

14. The method of claim 1, wherein the reductant is hydrogen gas.

15. The method of claim 14, wherein the hydrogen gas is produced by a combustion engine running a rich air/fuel mixture.

16. A method of desulfating a catalytic converter, comprising:
    transforming sulfur in the catalytic converter to hydrogen sulfide;
    transporting the hydrogen sulfide out of the catalytic converter,
    adsorbing the hydrogen sulfide to a nickel oxide catalyst; and
    flowing varying amounts of a reductant and an oxidant over the nickel oxide catalyst to chemically transform the hydrogen sulfide into at least one other gas-phase sulfur compound, wherein said varying amounts are selected in response to exhaust temperature of the catalytic converter, where said selection varies a duration of exposure of said reductant to perform said transforming even as exhaust temperature varies.

17. The method of claim 16, wherein the at least one other gas-phase sulfur compound is sulfur dioxide.

18. The method of claim 17, wherein the hydrogen sulfide is converted to sulfur dioxide via an intermediate nickel sulfide compound.

19. The method of claim 18, wherein flowing varying amounts of a reductant and an oxidant over the nickel oxide catalyst includes first flowing hydrogen over the catalyst to reduce the hydrogen sulfide to nickel sulfide, then flowing at least one of oxygen and sulfur dioxide over the catalyst to convert the nickel sulfide to nickel sulfate, and then flowing hydrogen over the catalyst to convert the nickel sulfate to nickel oxide and sulfur dioxide.

20. The method of claim 17, wherein flowing varying amounts of a reductant and an oxidant over the nickel oxide catalyst includes first flowing hydrogen over the catalyst to reduce the hydrogen sulfide to nickel sulfide, then flowing oxygen over the catalyst to directly convert the nickel sulfide to sulfur dioxide.

21. A method of desulfating a catalytic converter, comprising:
adjusting an exhaust air-fuel ratio entering said catalytic converter between rich and lean operation, where durations of said rich and lean operation are adjusted in response to catalyst temperature to:
form hydrogen sulfide from sulfur in the catalytic converter;
transport the hydrogen sulfide out of the catalytic converter and into a nickel oxide catalyst downstream of the catalytic converter;
form nickel sulfide from the hydrogen sulfide in the nickel oxide catalyst; and
form sulfur dioxide from the nickel sulfide in the nickel oxide catalyst.

22. The method of claim 21, wherein forming nickel sulfide from the hydrogen sulfide includes reacting the hydrogen sulfide with hydrogen gas on the nickel oxide catalyst.

23. The method of claim 21, wherein the hydrogen sulfide is reacted with hydrogen gas at a temperature of between approximately 625 and 675 degrees Celsius.

24. The method of claim 21, wherein the hydrogen gas is produced by a combustion engine running a rich air/fuel mixture.

25. The method of claim 21, wherein forming sulfur dioxide from the nickel sulfide includes forming nickel sulfate from the nickel sulfide, and then forming sulfur dioxide from the nickel sulfate.

26. The method of claim 25, wherein the nickel sulfate is formed by reacting the nickel sulfide with oxygen and sulfur dioxide, and wherein the sulfur dioxide is formed by reacting the nickel sulfate with hydrogen.

27. The method of claim 26, wherein the hydrogen is produced by a combustion engine running a rich air/fuel mixture.

28. The method of claim 26, wherein the nickel sulfide is reacted with oxygen and sulfur dioxide at a temperature of approximately 600 degrees Celsius, and wherein the nickel sulfate is reacted with hydrogen at a temperature of approximately 650 degrees Celsius.

29. The method of claim 21, wherein forming sulfur dioxide from the nickel sulfate includes reacting the nickel sulfide with oxygen to form sulfur dioxide directly.

30. The method of claim 29, wherein the nickel sulfide is reacted with the oxygen at a temperature of between 350 and 400 degrees Celsius.

31. In a mechanical apparatus having a combustion engine, a method of desulfating a catalytic converter, the method comprising:
forming hydrogen sulfide from sulfur in the catalytic converter;
transporting the hydrogen sulfide out of the catalytic converter and into a nickel oxide catalyst downstream of the catalytic converter;
providing a rich air/fuel ratio to the combustion engine for a first interval to increase an amount of a reductant in an exhaust stream from the engine; and
providing a lean air/fuel ratio to the combustion engine for a second interval to increase an amount of an oxidant in the exhaust stream, wherein durations of said rich and lean air/fuel ratios are adjusted in response to exhaust temperature of the converter.

32. The method of claim 31, wherein the reductant is hydrogen and reacts with the hydrogen sulfide on the nickel oxide catalyst to form nickel sulfide.

33. The method of claim 32, wherein the oxidant is oxygen and reacts with the nickel sulfide to form at least one of nickel sulfate and sulfur dioxide.

34. The method of claim 33, wherein the oxidant reacts with the nickel sulfide to form nickel sulfate, further comprising reacting the nickel sulfate with hydrogen to form sulfur dioxide.

35. The method of claim 34, wherein the hydrogen is formed by providing a rich air/fuel ratio to the combustion engine.

36. The method of claim 31, further comprising providing a rich air/fuel ratio to the combustion engine for a third interval.

37. The method of claim 31, wherein at least one of the first interval and second interval is defined by a fixed period of time.

38. The method of claim 31, wherein at least one of the first interval and second interval is defined by a number of engine cycles.

39. The method of claim 31, wherein the first interval is defined by a saturation point of hydrogen sulfide on the nickel oxide catalyst.

40. The method of claim 31, wherein the second interval is defined by a saturation point of an oxidant on a nickel sulfide intermediate.

* * * * *